June 11, 1935.  F. R. IBAÑEZ  2,004,325
ELASTIC COUPLING TO SUBSTITUTE AN INTERNAL GEAR
Filed Oct. 25, 1933

INVENTOR
F. R. IBAÑEZ
BY
ATTY.

Patented June 11, 1935

2,004,325

UNITED STATES PATENT OFFICE 2,004,325

ELASTIC COUPLING TO SUBSTITUTE AN INTERNAL GEAR

Francisco Roig Ibañez, Mexico, D. F., Mexico

Application October 25, 1933, Serial No. 695,172
In Mexico July 6, 1933

2 Claims.  (Cl. 74—415)

This invention is directed to a mechanical movement involving relatively rotatable elements either of which may serve as the driving element and which through their cooperation readily and conveniently transmit power from the driving element to the driven element.

The invention consists in the provision of independent shafts, one of which carries a disk-like member having non-radial projections on one surface and the other of which carries arms corresponding in number to the projections and terminally provided for cooperation with the projections to insure transfer of power from one to the other.

The invention is illustrated in the accompanying drawing, in which.

The construction in the embodiment illustrated includes a U-shaped frame T, the uprights S of which rotatably support stub shafts A and B respectively, which shafts project toward each other inwardly of the frame. On the terminal of the shaft A within the frame is secured a disk D on the face of which toward the shaft B are arranged a series of projections P the edges of which are arranged on the disk substantially parallel to a radial line of the disk and which extend from the peripheral edge of the disk inwardly toward but terminating materially short of the axial line of the disk.

On the end of the shaft B next the disk D is fixed an element carrying three radially projecting arms R. These arms are terminally provided with projections M on which are mounted rollers C. The relation of the parts is such that the rollers C move in a path on the disk D as a center which intersects the path of movement of the projections P on the shaft A as a center. The distance between the axial lines of the shafts A and B is equal to the overall length of the arms R from the shaft B.

Figure 1:
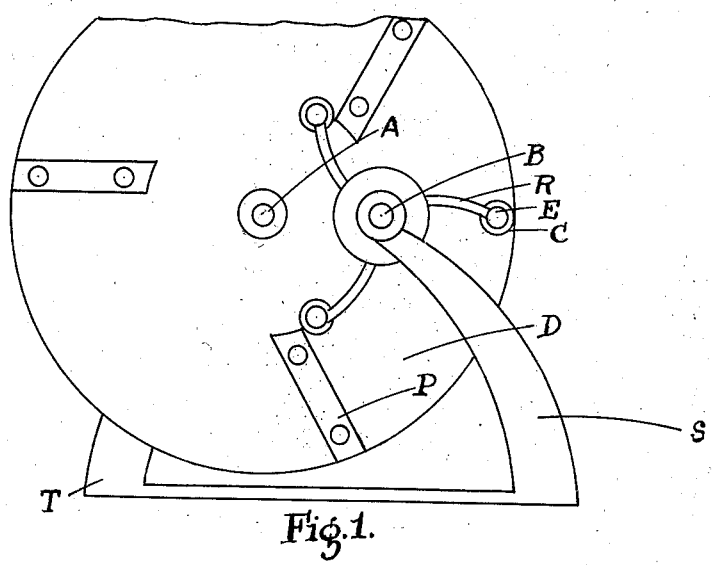
Figure 1 is a face view of the improved mechanical movement.
Figure 2:
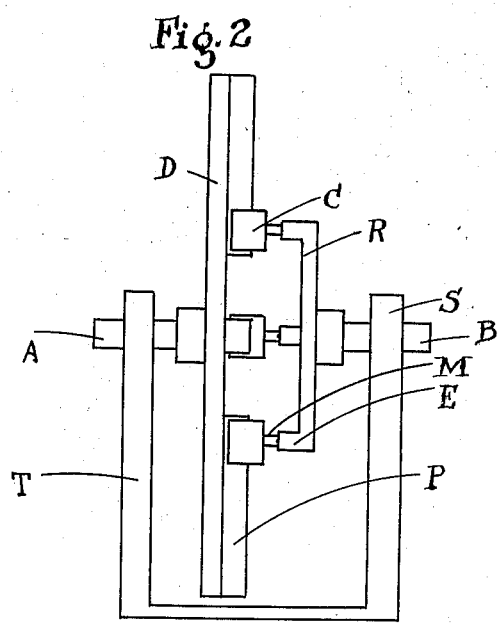
Figure 2 is an edge view of the same.

From Figure 2 of the drawing, it will be apparent that in the driving of either of the shafts A or B, the projections P and rollers C will cooperate to transmit motion one from the other.

Having described the invention, what I consider as new and desire to secure by Letters Patent is:

1. A mechanical movement including a disk mounted for rotation and provided with a plurality of substantially radial projections, a second disk mounted for rotation on an axis offset from the axis of the first disk and provided with a series of radiating arms corresponding in number to the number of projections of the first disk, the radial length of the arms corresponding to the linear distance between the axes of the respective disks, and rollers carried by the arms and moving, in the operation of the second disk, within the plane of movement of the projections, with the path of movement of the projections intersecting the path of movement of the rollers.

2. A mechanical movement including a disk mounted for rotation, a plurality of substantially radial projections secured on one face of the disk, said projections extending from the periphery of the disk to a point materially short of the axis of the disk, a second disk mounted for rotation on an axis offset from the axis of the first mentioned disk, with the second disk operating in a plane parallel to but offset from the plane of the first mentioned disk, and a series of arms projecting from the second disk and terminating in rollers moving the plane of the projections of the first disk, the relation of the terminal rollers of the second disk and the axes of the respective disks causing the rollers to engage and move along the sides of the projections on the first mentioned disk, whereby with one of the disks serving as a driving disk, the other disk will be driven.

FRANCISCO ROIG IBAÑEZ.